US012271139B2

(12) United States Patent
Omoto

(10) Patent No.: US 12,271,139 B2
(45) Date of Patent: Apr. 8, 2025

(54) TRANSPORT APPARATUS

(71) Applicant: SEIKO EPSON CORPORATION, Tokyo (JP)

(72) Inventor: Satoshi Omoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 222 days.

(21) Appl. No.: 17/650,085

(22) Filed: Feb. 7, 2022

(65) Prior Publication Data

US 2022/0253012 A1 Aug. 11, 2022

(30) Foreign Application Priority Data

Feb. 8, 2021 (JP) ................................ 2021-018029

(51) Int. Cl.

*G03G 15/00* (2006.01)
*B65H 7/02* (2006.01)
*B65H 7/20* (2006.01)

(52) U.S. Cl.

CPC ............ *G03G 15/607* (2013.01); *B65H 7/02* (2013.01); *B65H 7/20* (2013.01); *B65H 2511/11* (2013.01); *B65H 2513/512* (2013.01); *G03G 2215/00599* (2013.01); *G03G 2215/00734* (2013.01)

(58) Field of Classification Search

CPC .......... B65H 7/02; B65H 7/18; G03G 15/607; G03G 15/6564; G03G 15/502

See application file for complete search history.

(56) References Cited

U.S. PATENT DOCUMENTS

| | | | | |
|---|---|---|---|---|
| 4,563,079 A * | 1/1986 | Inuzuka | B65H 7/00 | 399/209 |
| 6,519,443 B1 * | 2/2003 | Coriale | B65H 5/34 | 399/388 |
| 8,215,637 B2 * | 7/2012 | Yano | H04N 1/00793 | 271/226 |
| 8,353,507 B2 * | 1/2013 | Chihara | B65H 1/14 | 271/154 |
| 8,430,398 B2 * | 4/2013 | Kamichi | B65H 1/04 | 271/171 |
| 10,913,627 B2 * | 2/2021 | Nagata | B65H 7/02 | |
| 2013/0142532 A1 * | 6/2013 | Kitagawa | G03G 15/2032 | 399/70 |

FOREIGN PATENT DOCUMENTS

| | | | | |
|---|---|---|---|---|
| JP | S56-052344 A | 5/1981 | | |
| JP | 58085451 A * | 5/1983 | | |
| JP | 2001-302030 A | 10/2001 | | |
| JP | 2007-286079 A | 11/2007 | | |
| JP | 2008-273642 A | 11/2008 | | |
| JP | 2014-215575 A | 11/2014 | | |
| JP | 2018-104178 A | 7/2018 | | |
| JP | 6758932 B2 * | 9/2020 | B41J 2/04501 | |

* cited by examiner

*Primary Examiner* — Patrick Cicchino

(74) *Attorney, Agent, or Firm* — Global IP Counselors, LLP

(57) ABSTRACT

A transport apparatus includes: a transport mechanism that transports a medium manually inserted; and a control unit that changes, depending on a type of the medium, a start timing of transporting the medium.

7 Claims, 4 Drawing Sheets

TRANSPORT APPARATUS

The present application is based on, and claims priority from JP Application Serial Number 2021-018029, filed Feb. 8, 2021, the disclosure of which is hereby incorporated by reference herein in its entirety.

BACKGROUND

1. Technical Field

The present disclosure relates to a transport apparatus, a method for producing a print product, and a method for producing scan data.

2. Related Art

A transport apparatus that transports a manually inserted transport target has been known. JP-A-2018-104178 describes that the transport of a transport target is started after an elapsed time from the instruction to start the transport reaches a wait time of a predetermined length.

How easy it is to manually insert and set a medium that is a transport target varies depending on the type of the medium. A transport control depending on the type of a medium has not been conducted.

SUMMARY

A transport apparatus according to an aspect of the present disclosure includes: a transport mechanism that transports a medium manually inserted; and a control unit that changes, depending on a type of the medium, a start timing of starting transport of the medium.

DESCRIPTION OF EXEMPLARY EMBODIMENTS

Embodiments of the present disclosure will be described herein in accordance with the following order.

(1) Configuration of Multifunction Apparatus:

(2) Transport Process:

(3) Other Embodiments:

(1) Configuration of Multifunction Apparatus

Figure 1:
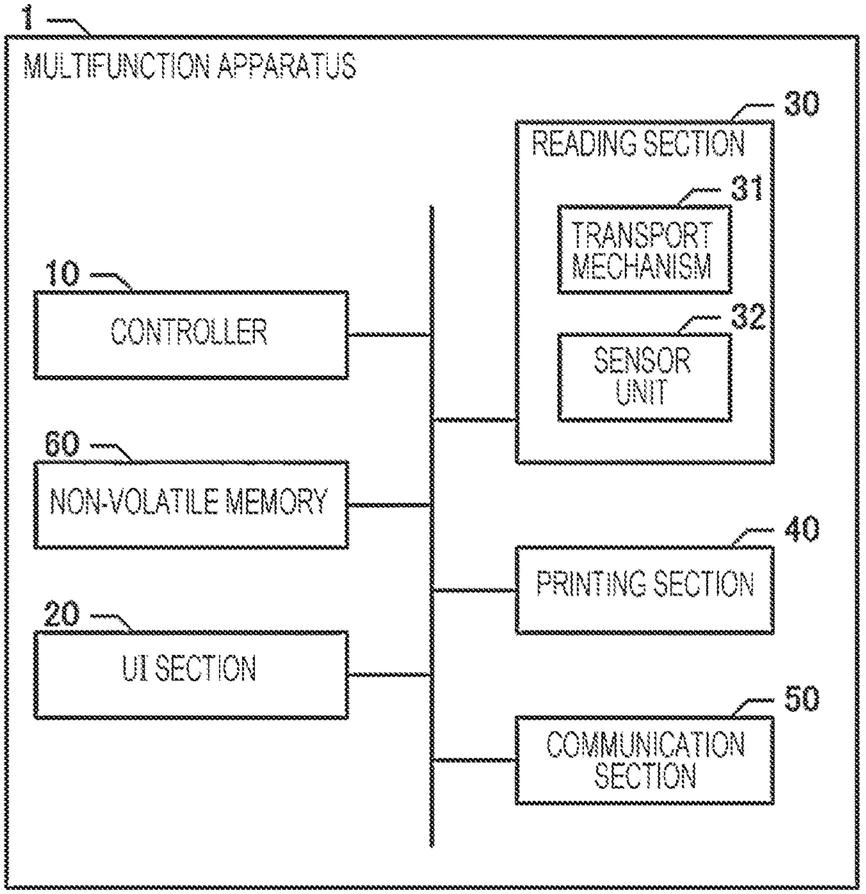
FIG. 1 is a block diagram of a multifunction apparatus.

FIG. 1 is a block diagram illustrating a configuration of a multifunction apparatus 1 as a transport apparatus according to an embodiment of the present disclosure. The multifunction apparatus 1 of this embodiment is larger in size than multifunction apparatuses that are generally used in homes and offices and is configured to generate image data by reading a copy (medium) having large size such as A0 size or A1 size, for example, and perform printing on a print medium having large size. The multifunction apparatus 1 includes a controller 10, a UI section 20, a reading section 30, a printing section 40, a communication section 50, and a non-volatile memory 60.

The controller 10 includes a central processing unit (CPU), a random access memory (RAM), a read only memory (ROM), and the like, which are not illustrated, and executes programs recorded in the non-volatile memory 60 or the ROM to control each section of the multifunction apparatus 1. The controller 10 may be configured with a single chip or may be configured with a plurality of chips. In addition, as a processor, for example, an application specific integrated circuit (ASIC) may be employed instead of the CPU, or the CPU and the ASIC may be configured to cooperate together. The UI section 20 functions as a user interface that outputs information to a user and receives operation from the user.

Figure 2:
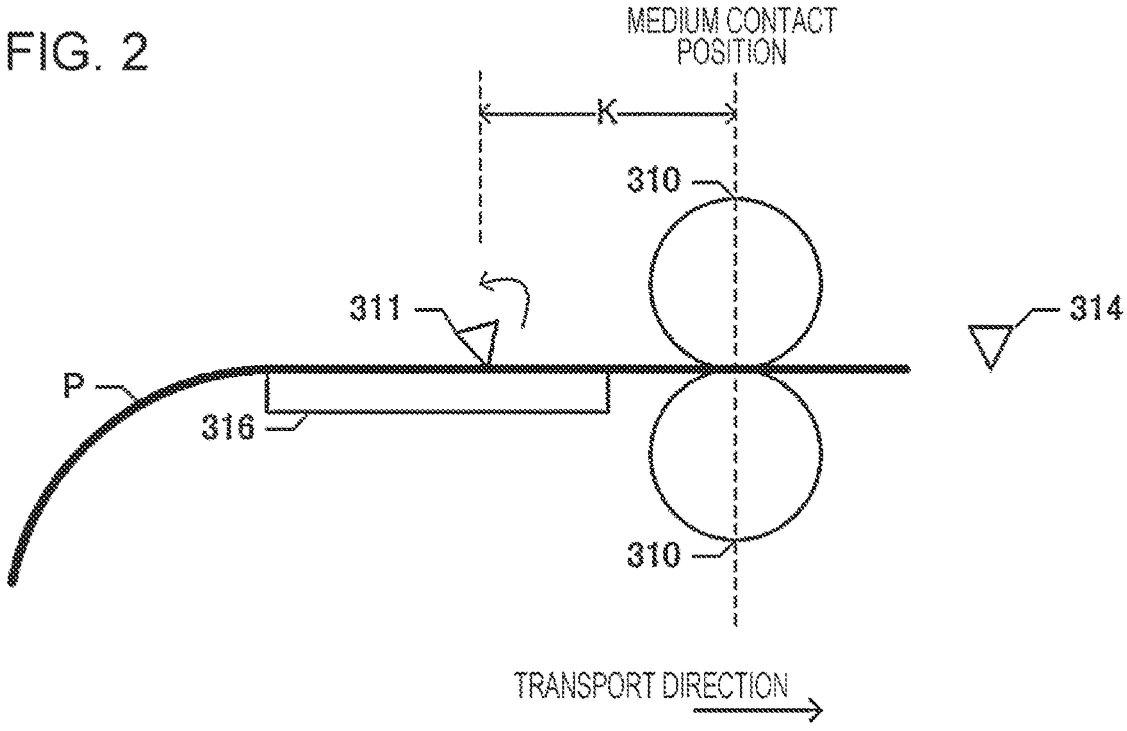
FIG. 2 is a schematic diagram of a transport mechanism.
Figure 3:
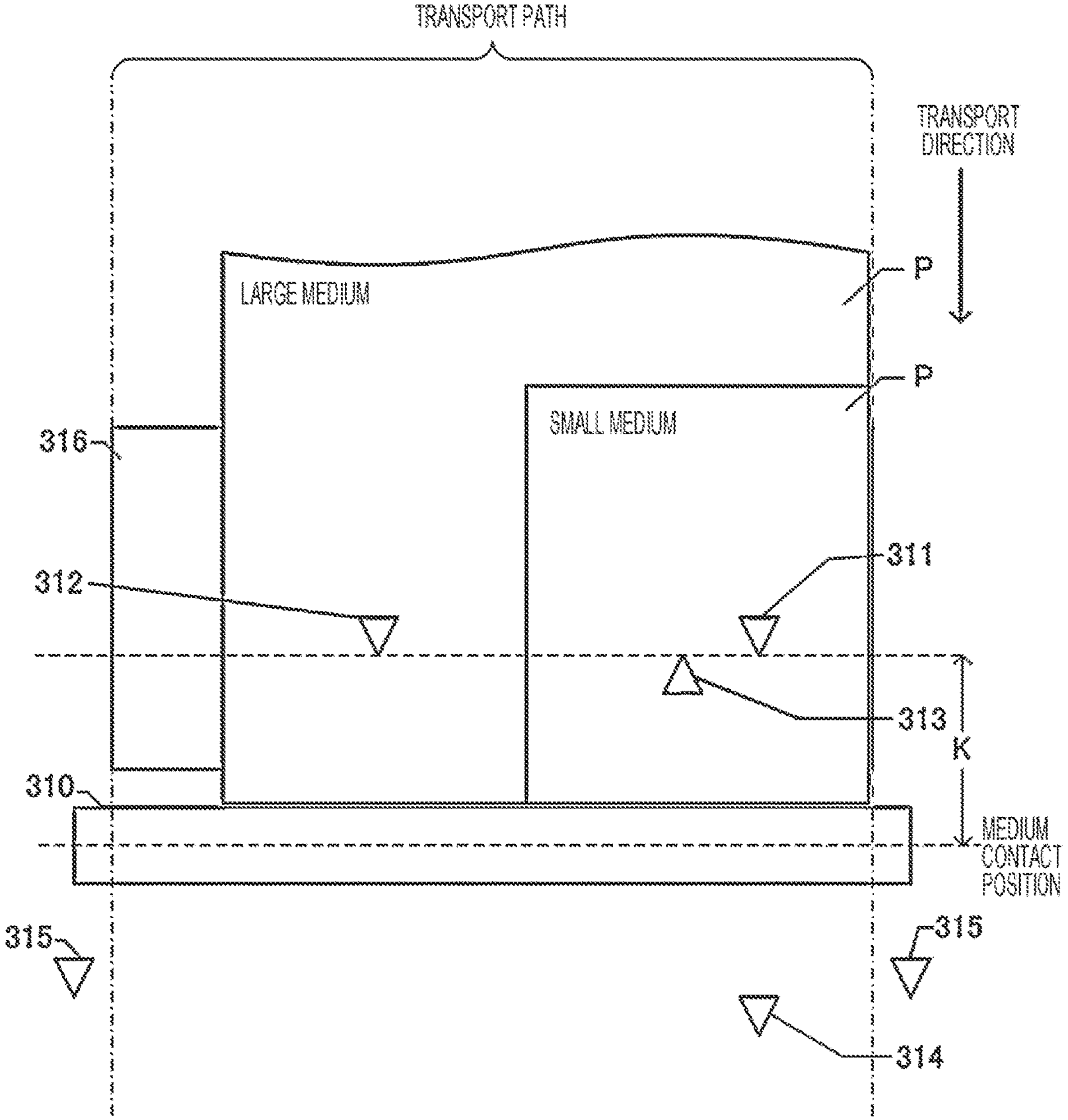
FIG. 3 is a schematic diagram of the transport mechanism.

The reading section 30 performs a scanning operation to read a manually inserted copy (medium). The reading section 30 includes a transport mechanism 31 and a sensor unit 32. In this embodiment, a copy (medium) is manually inserted and set. A copy (medium) to be manually inserted has various sizes from large sizes such as A0 size and small sizes such as A4 size, for example. FIGS. 2 and 3 are schematic diagrams illustrating the configuration of the transport mechanism 31. The transport mechanism 31 includes feed rollers 310, a medium setting detection sensor 311, a medium size detection sensor 312, a thin paper detection sensor 313, a feed detection sensor 314, skew sensors 315, a table 316, and transport rollers (not illustrated).

The transport mechanism 31 transports a medium P manually inserted into an insertion port formed in a body, which is not illustrated, and discharges the medium P from a discharge port. The direction in which the medium P is transported is referred to as a transport direction. At the insertion port, a table 316 is provided. The user places a leading end portion of the medium P on the table 316, inserts the medium P from the insertion port, and brings a leading end of the medium P into contact with the feed rollers 310 to manually insert and set the medium P. FIG. 3 is a schematic diagram illustrating the state in which the medium P is set at a set position when manually inserted and set. The set position for the medium P is a position in which the medium P is placed when the medium P is correctly manually inserted and set. At the set position for the medium P, the medium setting detection sensor 311, the medium size detection sensor 312, and the thin paper detection sensor 313 are disposed.

The medium setting detection sensor 311 is provided at a position before the feed rollers 310 in the transport direction and at a predetermined distance K from the feed rollers 310. In this embodiment, the medium setting detection sensor 311 has a mechanism to rotate from the state before passage of the medium P when the leading end of the medium P inserted from the insertion port and pressed and advanced toward the feed rollers 310 by the user comes into contact with the medium setting detection sensor 311 (see FIG. 2). When the medium setting detection sensor 311 detects the rotation, the medium setting detection sensor 311 outputs a signal indicating that the medium P has been set. By acquiring this signal, the controller 10 can detect that the medium P has been manually inserted and set. Note that the medium setting detection sensor 311 may be of a mechanical system as described above or may be configured with another system such as an optical system (such as a photo interrupter) in another embodiment.

The medium size detection sensor 312 is a sensor for detecting whether the size of the medium P is large or small. The medium size detection sensor 312 is provided at a position before the feed rollers 310 in the transport direction and at the predetermined distance K (the same distance as that from the medium setting detection sensor 311 to the feed rollers 310) from the feed rollers 310 as illustrated in FIG. 3. The medium P in this embodiment is set such that an end portion of the medium P is brought close to one end portion, as a reference, of the transport path in a direction orthogonal to the transport direction as illustrated in FIG. 3 irrespective of the size of the medium P. Outside the end portion, for example, a copy guide for aligning the medium P is provided. In FIG. 3, the end portion of the transport path on the right side of the drawing is the reference end portion.

The medium size detection sensor 312 is provided away from the medium setting detection sensor 311 in the direction orthogonal to the transport direction. The medium setting detection sensor 311 is provided at a position at which a set medium having a minimum size passes, and the medium size detection sensor 312 is provided at a position at which the medium having the minimum size does not pass but a medium having a size larger than a predetermined size passes. In this embodiment, the medium setting detection sensor 311 is provided on a reference end portion side of the transport path and the medium size detection sensor 312 is provided on an opposite end portion side of the transport path. In this embodiment, the medium size detection sensor 312 has the same mechanism as that of the medium setting detection sensor 311. When pressed by the leading end of the medium P, the medium size detection sensor 312 detects the rotation of the mechanism and outputs a signal indicating that the leading end of the medium P has been brought into contact. When the controller 10 acquires signals indicating that the leading end of the medium is brought into contact not only from the medium setting detection sensor 311 but also from the medium size detection sensor 312, the controller 10 determines that the manually inserted and set medium is a medium larger than the predetermined size. When the controller 10 acquires a signal from the medium setting detection sensor 311 but not from the medium size detection sensor 312, the controller 10 determines that the manually inserted and set medium has a small size equal to or less than the predetermined size.

The thin paper detection sensor 313 detects the thickness of paper using ultrasonic waves. The thin paper detection sensor 313 is provided at a position before the feed rollers 310 in the transport direction, at the predetermined distance K from the feed rollers 310, and near the medium setting detection sensor 311. When the medium setting detection sensor 311 detects that the medium P is set, the thin paper detection sensor 313 detects the thickness of the medium P and outputs a signal indicating the thickness. The controller 10 can determine whether or not the manually inserted and set medium P is thinner than a medium having a predetermined thickness from this signal. It goes without saying that the thickness of paper may be detected by another method without using ultrasonic waves.

The feed rollers 310 are driven to rotate by a motor, which is not illustrated, and transports the medium P manually inserted in the transport direction. The controller 10 controls the timings of the start of driving the motor and the end of driving the motor, thereby controlling the rotation time of the feed rollers 310 (transport time for feeding). The feed detection sensor 314 is provided further forward of the feed rollers 310 in the transport direction. In this embodiment, the feed detection sensor 314 has the same configuration as that of the medium setting detection sensor 311. Specifically, when the feed detection sensor 314 detects that the leading end of the medium P, which has been transported by the feed rollers 310 forward of the feed rollers 310, arrives, the feed detection sensor 314 outputs a signal indicating that the medium P has arrived. When acquiring this signal, the controller 10 detects that the medium P has been fed by the feed rollers 310.

The skew sensors 315 are provided forward of the feed rollers 310 in the transport direction and on respective outer sides of the transport path in the direction orthogonal to the transport direction. The skew sensors 315 are sensors for detecting that the medium P is being transported obliquely and are provided at positions which the medium P may pass when being transported obliquely. In other words, when the medium P is being transported straight but not obliquely, the skew sensors 315 do not detect the medium P. The skew sensors 315 only have to be capable of detecting that the medium P has passed and may be configured with the same mechanical system as that of the medium setting detection sensor 311 or may be configured with an optical system. When acquiring a signal indicating the detection of the medium P from at least one of the skew sensors 315, the controller 10 determines that a skew error has occurred.

Transport rollers, which are not illustrated, are provided further forward of the feed detection sensor 314 in the transport direction. The transport rollers (not illustrated) transport the medium P having been transported by the feed rollers 310 toward the discharge port. In the course of this transport, the sensor unit 32, which will be described later, reads the medium P.

The sensor unit 32 includes an image sensor and a light source, which are not illustrated. The light source irradiates the reading surface of the transported medium P with light. The image sensor is, for example, a CIS, and detects reflected light from the medium P and outputs an electric signal according to the detected amount of light. The sensor unit 32 converts the outputted electric signal into a digital signal using a conversion circuit, which is not illustrated, to acquire image data. The image data read from the medium P by the sensor unit 32 is outputted to the communication section 50, the printing section 40, or the non-volatile memory 60.

The communication section 50 includes various communication interfaces for communicating with external apparatuses by wire or wirelessly. In addition, the communication section 50 includes an interface for communicating with various removable memories attached to the multifunction apparatus 1. The image data read by the reading section 30 may be outputted to an external apparatus or recorded into a removable memory via the communication section 50.

The printing section 40 performs printing, on a print medium, based on, for example, image data read by the reading section 30, print data received from a computer, which is not illustrated, via the communication section 50, or the like. The printing section 40 includes actuators, sensors, drive circuits, mechanical components, and the like for performing printing on a print medium by any of various printing methods such as the ink jet method and the electrophotographic method.

Figure 4:
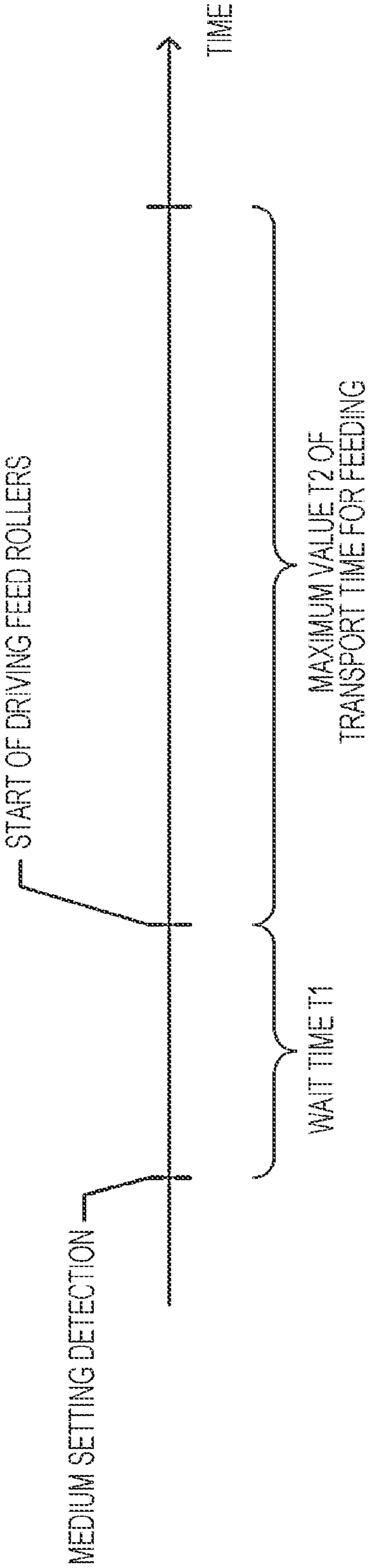
FIG. 4 is a timing chart for explaining a wait time and a maximum value of a transport time for feeding.

In this embodiment, the multifunction apparatus 1 is configured to automatically feed the medium P after a wait time upon detecting that the medium P as a copy to be read is manually inserted and set and wait for input of a scan start instruction after the feeding is completed. The multifunction apparatus 1 is configured to then perform reading while transporting the medium P upon input of the scan start instruction. Specifically, once the medium setting detection sensor 311 detects that the medium P is set, the controller 10 waits for a wait time T1 having a predetermined length to elapse since the detection and, after the elapse of the wait time T1, starts rotating the feed rollers 310 to feed the medium P, as illustrated in FIG. 4. In this event, the controller 10 sets a maximum value (T2) of the transport time for feeding the medium P and rotates the feed rollers 310 for feeding for the time T2 at most. The controller 10 waits for the feed detection sensor 314 to output a signal indicating that the medium P is fed while driving the feed rollers 310, that is, while the time T2 has not elapsed yet. When the feed detection sensor 314 outputs the signal, the controller 10 determines that the medium P has been fed, temporarily stops the feed rollers 310, and waits for the user to input the scan start instruction. Once the user inputs the scan start instruction, the controller 10 causes the sensor unit 32 to perform reading while driving the transport rollers, which are not illustrated, to transport the medium P.

On the other hand, in a case in which a signal indicating that the medium P is fed is not acquired from the feed detection sensor 314 even when the feed rollers 310 are rotated for feeding for the time T2 of the maximum value, the controller 10 determines that the multifunction apparatus 1 is in a state where the medium P has been jammed by the feed rollers 310, or a state where the medium P has not been transported because the medium P has not been in contact with the feed rollers 310, or a state where the leading end of the medium P has not reached the detecting position of the feed detection sensor 314 because of delay in bringing the medium P into contact with the feed rollers 310. These states will be referred to as a feed error.

How easy it is to manually insert and set the medium P varies depending on the type of the medium P. The type of the medium P may be assumed to be, for example, the size, the thickness (hardness), or the like of the medium P. When manually inserting and setting a medium P that is difficult to manually insert and set, the user sometimes inserts the medium P into the insertion port carefully over time longer than when manually inserting and setting a medium P that is easy to manually insert and set. For example, a medium P having large size is sometimes inserted into the insertion port carefully over time so that the medium P is brought into contact with the feed rollers 310 while orientation being maintained with the side of the leading end being orthogonal to the transport direction. In addition, in the case of a thin and soft medium, because the leading end portion of the medium P bends when the medium P comes into contact with the mechanism of the medium setting detection sensor 311 of the mechanical system or the medium size detection sensor 312 or because of other reasons, it is difficult to activate the mechanisms. For this reason, such a medium P is sometimes inserted into the insertion port carefully over time so that the medium P will not bend.

As described above, the feed rollers 310 are configured to start to be driven after the medium setting detection sensor 311 detects the medium P and further after the wait time T1 elapses. However, when the medium P is inserted over time longer than usual because of difficulty in the medium P being manually inserted and set, there may be a case in which the leading end of the medium P is not brought into contact with the feed rollers 310 by the time when the feed rollers 310 start to be driven after the medium setting detection sensor 311 detects that the medium is set. When the leading end of the medium P reaches the feed rollers 310 after the feed rollers 310 start to be rotated, the medium P starts to be transported with delay. The maximum value (T2) is set in advance for the driving time of the feed rollers 310 (transport time for feeding), and once the time T2 elapses, the feed rollers 310 are temporarily stopped. When the leading end of the medium P does not reach the feed detection sensor 314 by the elapse of the time T2, a feed error occurs.

On the other hand, when the wait time T1 is set to long time without exception in consideration of a possibility that the medium P is manually inserted and set over time, the wait time T1 may be unnecessarily long for the user in the case of a medium that is easy to manually insert and set. In addition, when the maximum value (T2) of the transport time for feeding is increased, it increases the possibility that the medium P is damaged when jamming occurs (because the feed rollers 310 continue rotating until the maximum value (T2) with jamming). In view of this, in this embodiment, the controller 10 changes the wait time T1 until the start of transporting a medium and the maximum value (T2) of the transport time for feeding, depending on the type of the medium. In this case, the controller 10 functions as a control unit.

Specifically, the controller 10 sets the wait time for a large medium to a longer time than the wait time for a small medium. When acquiring signals indicating medium detection from both the medium setting detection sensor 311 and the medium size detection sensor 312, the controller 10 determines that the size of the set medium is large (the width in the direction orthogonal to the transport direction is large). When acquiring the signal indicating medium detection from the medium setting detection sensor 311 but not acquiring the signal indicating medium detection from the medium size detection sensor 312, the controller 10 determines that the size of the set medium is small. The controller 10 sets the wait time T1 to a value larger than a default value for a large medium. Moreover, the controller 10 sets the maximum value (T2) of the transport time for feeding to a value larger than a default value for a large medium.

In addition, the controller 10 sets the wait time for a soft medium to a longer time than the wait time for a hard medium. The controller 10 determines whether or not the set medium is a thin soft medium from the output of the thin paper detection sensor 313. Then, the controller 10 sets the wait time T1 to a value larger than the default value for a thin (soft) medium. Moreover, the controller 10 sets the maximum value (T2) of the transport time for feeding to a value larger than the default value for a thin (soft) medium.

Note that an error during transport such as a feed error or a skew error may occur even when it is not determined that the size of the medium is large in accordance with the output of the medium size detection sensor 312 or when it is not determined that the medium is thin in accordance with the output of the thin paper detection sensor 313. In view of this, the controller 10 sets the wait time for a medium that causes a large number of errors during transport to a longer time than the wait time for a medium that causes a small number of errors during transport. In this embodiment, when a feed error or a skew error occurs consecutively twice or more, the controller 10 determines that the set medium is a medium that is difficult for the user to manually insert and set and sets the wait time T1 to a longer time than the default value. In addition, when a feed error or a skew error occurs consecutively twice or more, the controller 10 sets the maximum value (T2) of the transport time for feeding to a longer time than the default value.

When none of the above-described three conditions (the size of the medium is large, the medium is thin, and an error occurs consecutively twice or more) are satisfied, the controller 10 sets the wait time T1 to the default value. In addition, When none of the above-described three conditions are satisfied, the controller 10 sets the maximum value (T2) of the transport time for feeding to the default value.

Note that in this embodiment, 0.8 seconds is employed as the default value for the wait time T1 and 1.2 seconds as the value larger than the default value. In addition, 1 second is employed as the default value for the maximum value (T2) of the transport time for feeding and 5 seconds as the value larger than the default value.

As described above, in this embodiment, the wait time T1 is changed depending on the type of the medium. When a medium that is assumed to have a high difficulty to be manually inserted and set is used, the wait time T1 and the maximum value (T2) of the transport time for feeding are set to larger values than the default values, thereby making a feed error unlikely to occur. As a result, since it is not necessary to manually insert and set the medium again and again, the convenience for the user improves. In addition, when the user uses a medium that is assumed to have a low difficulty to be manually inserted and set, it is possible to perform reading with fast response without requiring unnecessary wait time.

(2) Transport Process

Figure 5:
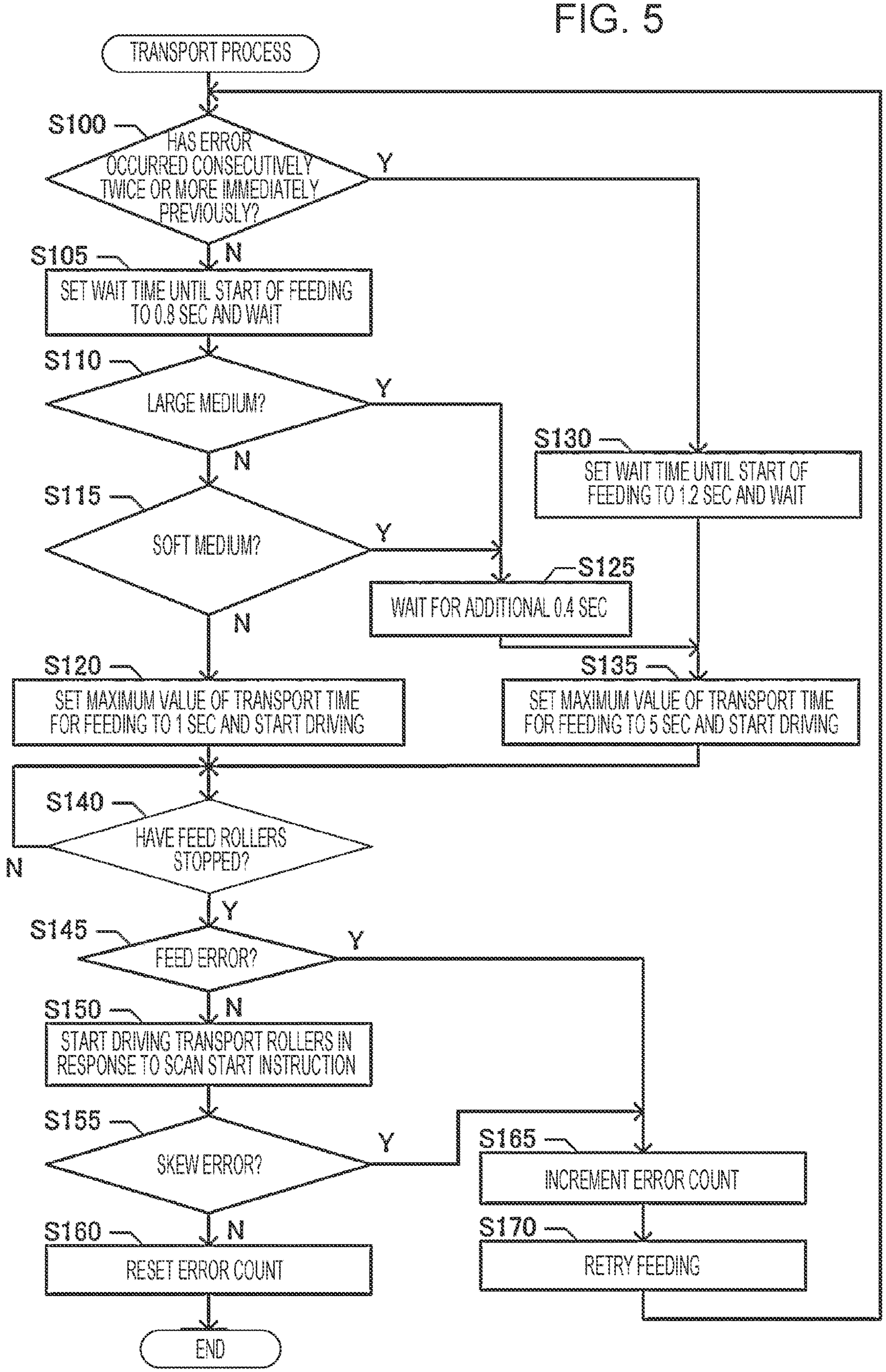
FIG. 5 is a flowchart of a transport process.

FIG. 5 is a flowchart illustrating the transport process. The transport process is started when the medium setting detection sensor 311 detects that the medium P is set. Once the transport process is started, the controller 10 determines whether or not an error has occurred consecutively twice or more immediately previously (Step S100). Specifically, the controller 10 determines whether or not the scan has not been completed consecutively twice or more due to occurrence of a feed error or a skew error in the scanning of a medium that is assumed to be the same medium. Hence, an error that has occurred further before a predetermined time (for example, 5 minutes) from the current time may be excluded for the determination. When it is determined that an error has occurred consecutively twice or more immediately previously in Step S100, the controller 10 sets the wait time T1 until the start of feeding to 1.2 seconds, which is longer than the default value, and waits (Step S130). Once 1.2 seconds, which is the wait time T1, elapses, the controller 10 subsequently sets the maximum value (T2) of the transport time for feeding to 5 seconds, which is longer than the default value, and starts driving the feed rollers 310 (Step S135). Specifically, the controller 10 drives a transport motor, which is not illustrated, to rotate the feed rollers 310.

When it is not determined that an error has occurred consecutively twice or more immediately previously in Step S100, the controller 10 sets the wait time T1 until the start of feeding to 0.8 seconds, which is the default value, and waits (Step S105). Once 0.8 seconds, which is the wait time T1, elapses, the controller 10 subsequently determines whether or not the set medium is large (Step S110). Specifically, the controller 10 determines that the set medium is large when a signal indicating the detection of the medium is outputted also from the medium size detection sensor 312. When it is determined that the medium is large in Step S110, the controller 10 additionally waits for 0.4 seconds (Step S125). Specifically, the wait time T1 is set to 1.2 seconds in total similarly in Step S130 by the controller 10 additionally waiting for 0.4 seconds in addition to 0.8 seconds for which the controller 10 waited in Step S105. Subsequently, the controller 10 executes Step S135.

When it is not determined that the medium is large in Step S110, the controller 10 determines whether or not the medium is soft (Step S115). Specifically, the controller 10 acquires the thickness of the set medium, based on the output of the thin paper detection sensor 313, and determines that the medium is soft when the medium has a thickness smaller than the predetermined thickness. When it is determined that the medium is soft in Step S115, the controller 10 executes Step S125 and Step S135.

When it is not determined that the medium is soft in Step S115, the controller 10 sets the maximum value (T2) of the transport time for feeding to 1 second, which is the default value, and starts driving the feed rollers 310 (Step S120). Specifically, the controller 10 drives the transport motor, which is not illustrated, to start rotating the feed rollers 310.

After executing Step S120 or Step S135, the controller 10 waits until the feed rollers 310 stop (Step S140). In this embodiment, the controller 10 is configured to stop driving the feed rollers 310 in a case where the feed detection sensor 314 has detected the medium P even when the period of the maximum value (T2) has not elapsed. In addition, the controller 10 is configured to stop driving the feed rollers 310 when the feed detection sensor 314 has not detected the medium P and the period of the maximum value (T2) has elapsed. For this reason, it is determined whether or not any of these events has occurred in Step S140.

When it is determined that the feed rollers 310 have stopped in Step S140, the controller 10 determines whether or not a feed error has occurred (Step S145). Specifically, the controller 10 determines whether or not the medium P is not detected by the feed detection sensor 314 even when the feed rollers 310 are rotated during the period of the maximum value (T2) of the transport time set in Step S120 or S135.

When it is determined that a feed error has occurred in Step S145, the controller 10 increments the error count (Step S165) and urges, via the UI section 20, the user to retry feeding (Step S170). For example, the controller 10 urges the user to retry the manual insertion and setting by pulling the medium out of the insertion port and inserting the medium into the insertion port again. Then, once the controller 10 determines that the output of the medium setting detection sensor 311 changes from the state of not detecting the medium to the state of detecting the medium again, the controller 10 returns to the processing of Step S100. Note that the initial value of the error count is 0, and the error count is incremented by 1 in Step S165.

When it is not determined that the feed error has occurred in Step S145, the controller 10 starts driving the transport rollers in response to a scan start instruction (Step S150). Specifically, once the user inputs the scan start instruction by operating the UI section 20, the controller 10 starts driving the transport rollers in response to the instruction. In the course of this transport, the sensor unit 32 reads the medium, and the controller 10 acquires image data of the medium P. In addition, the controller 10 determines whether or not a skew error has occurred in the course of the transport by the transport rollers (Step S155). Specifically, the controller 10 monitors the output of the skew sensors 315 and determines whether or not a skew error has occurred from the output of the skew sensors 315 while the transport rollers are being driven.

When it is determined that a skew error has occurred in Step S155, the controller 10 executes Step S165 and Step S170. Note that when a skew error has occurred, the controller 10 stops driving the transport rollers. The transport rollers are configured to stop when the entire medium is completely transported and discharged from the discharge port. When it is not determined that a skew error has occurred in Step S155, the controller 10 resets the error count (Step S160).

(3) Other Embodiments

The above-described embodiment is an example of implementing the present disclosure, and various other embodiments may be employed. For example, the transport apparatus may be a scanner including a scan mechanism and scanning a transported medium to produce scan data, may be a printer including a printing mechanism and printing a transported medium to produce a print product, or may be a laminator including a laminating mechanism and laminating a transported medium to produce a product. In addition, the present disclosure may be applied to a transport apparatus for a copy in a reading section included in a multifunction apparatus, or the present disclosure may be applied to a transport apparatus for a print medium in a printing section included in a multifunction apparatus. In addition, the medium, which is the transport target of the transport apparatus, may be paper or may be any of various other materials such as plastic other than paper.

The transport mechanism only has to be capable of transporting a medium manually inserted. The configurations of the feed rollers and the transport rollers and the mode of the transport path given in the above-described embodiment are an example, and any of various other configurations may be employed.

The type of a medium may be determined in any way. For example, it is possible to employ a configuration in which the user manually sets, in advance, information on the size of a medium, whether or not the medium is a thin medium, the shape of the medium, the orientation of the medium, the material of the medium, and the like and in which the type of the medium is determined based on the set content. Alternatively, it is possible to employ a configuration in which the type of a medium is automatically acquired by sensors as in the above-described embodiment.

The mode and arrangement of sensors that detect information for determining the type of a medium may be configured in various ways other than those in the above-described embodiment. In addition, the sensor for detecting a skew error may be provided at a position other than that explained in the above-described embodiment. For example, a skew sensor may be provided at a position before the feed rollers 310 (a position for setting a medium) in order to detect a skew error at the feed timing. It is possible to employ a configuration in which when a skew error is detected while a medium is manually inserted and set, the wait time T1 is extended. In addition, For example, it is possible to employ a configuration in which a skew error is detected by pre-scanning using a read sensor.

In addition, as an error related to the transport of a medium, an error other than the feed error or the skew error may be detected. In this case, errors during the transport may include an error other than the feed error or the skew error.

In addition, the transport control may be changed depending on the type of the medium. What is focused on as the type of the medium may be set as appropriate depending on what kind of medium is accepted. For a medium that is difficult for the user to set, the wait time T1 may be made longer than that for a medium that is easy to set. For example, all of a configuration in which the transport control is changed depending on the size of the medium, a configuration in which the transport control is changed depending on the softness (thinness) of the medium, and a configuration in which the transport control is changed depending on the error count during transport may be employed, or any one of them may be selected and employed. Moreover, in addition to these or in place of these, it is possible to change the transport control depending on other properties of the medium. In addition, the change of the transport control may involve both the wait time T1 and the maximum value (T2) of the transport time for feeding or may involve only the former. In addition, the wait time T1 and the maximum value (T2) of the transport time may be selected each from two options depending on the type of the medium or may be selected each from three or more options. In addition, when the type of the medium successively changes, these times (T1, T2) may be successively determined.

Moreover, it is possible to employ a configuration in which the type of a medium for use and the feed error count are stored in association with each other for each user, and the wait time T1 and the maximum value (T2) of the transport time for feeding are automatically selected and adopted for each user based on this association.

In addition, the start timing of transporting may be determined with the timing at which a sensor detects a medium as the start of the wait time, or the start timing of transporting may be determined with the timing at which the user operates a "start" button to give an instruction to start transport as the start of the wait time. Specifically, it is possible not to start feeding until a wait time T3 elapses after the user operates the "start" button and to start feeding in response to the elapse of the wait time T3 after the user operates the "start" button. Alternatively, it is possible not to start feeding until the wait time T3 elapses after the user operates the "start" button and to start feeding in response to the elapse of the wait time T1 after the wait time T3 (provided that T3>T1) elapses after the user operates the "start" button and further after a sensor detects that the medium is set.

Moreover, it is possible to adopt a program or a method executed by a computer or a production method for producing a product by processing a transported medium similarly to the present disclosure. In addition, the system, program, and method as above may be implemented as a single apparatus or may be implemented by utilizing components included in a plurality of apparatuses and include various modes. In addition, modifications may be made as appropriate such as that in which part is software and part is hardware. Moreover, the present disclosure may be established as a recording medium for a program for controlling the system. It goes without saying that the recording medium for the program may be a magnetic recording medium or may be a semiconductor memory with any recording media to be developed in the future similarly taken into account.

What is claimed is:

1. A transport apparatus comprising:

a transport mechanism that transports a medium manually inserted to feed the medium in a transport direction, and that includes feed rollers rotating to transport the medium;

a medium setting detection sensor that is arranged upstream relative to the feed rollers in the transport direction and spaced apart from the feed rollers in the transport direction, and that detects the medium; and a control unit that changes a wait time depending on a type of the medium, the wait time being a time from when the medium setting detection sensor detects the medium and to when the feed rollers start transporting the medium, waits for a changed wait time that has been changed, after the medium is manually inserted, and starts transporting of the medium after waiting for the changed wait time after changing the wait time, the control unit changing the wait time by setting the wait time for the medium for which an error during transport has occurred consecutively twice or more in a predetermined time to a longer time than the wait time for the medium for which an error during transport has not occurred consecutively twice or more in the predetermined time.

2. The transport apparatus according to claim 1, wherein the control unit changes the wait time further by setting the wait time for the medium that has a size which is larger than a predetermined size to a longer time than the wait time for the medium that has a size which is not larger than the predetermined size.

3. The transport apparatus according to claim 1, wherein the control unit changes the wait time further by setting the wait time for the medium that has a thickness which is thinner than a predetermined thickness to a longer time than the wait time for the medium that has a thickness which is not thinner than the predetermined thickness.

4. The transport apparatus according to claim 1, further comprising a sensor in a set position for the medium, wherein the control unit determines, based on output of the sensor, the type of the medium.

5. The transport apparatus according to claim 1, wherein the transport mechanism includes a feed detection sensor that detects the medium transported by the feed rollers and outputs to the control unit a signal indicating that the medium is detected, and the control unit changes, depending on the type of the medium, a maximum value of a transport time for rotating the feed rollers to transport the medium, after starting the transporting of the medium by the feed rollers, the control unit stops rotation of the feed rollers when the control unit does not acquire the signal from the feed detection sensor before the maximum value of the transport time elapses.

6. A method for producing a print product using a transport apparatus including a transport mechanism that transports a medium manually inserted to feed the medium in a transport direction, and that includes feed rollers rotating to transport the medium, a medium setting detection sensor that is arranged upstream relative to the feed rollers in the transport direction and spaced apart from the feed rollers in the transport direction, and that detects the medium, and a control unit that changes a wait time depending on a type of the medium, the wait time being a time from when the medium setting detection sensor detects the medium and to when the feed rollers start transporting the medium, waits for a changed wait time that has been changed, after the medium is manually inserted, and starts transporting of the medium after waiting for the changed wait time after changing the wait time, the method comprising:

acquiring the type of the medium;

changing the wait time depending on the type of the medium, by setting the wait time for the medium for which an error during transport has occurred consecutively twice or more in a predetermined time to a longer time than the wait time for the medium for which an error during transport has not occurred consecutively twice or more in the predetermined time;

waiting for the changed wait time after the medium is manually inserted;

starting the transporting of the medium after waiting for the changed wait time after changing the wait time; and performing printing on the medium being transported to produce a print product.

7. A method for producing scan data using a transport apparatus including a transport mechanism that transports a medium manually inserted to feed the medium in a transport direction, and that includes feed rollers rotating to transport the medium, a medium setting detection sensor that is arranged upstream relative to the feed rollers in the transport direction and spaced apart from the feed rollers in the transport direction, and that detects the medium, and a control unit that changes a wait time depending on a type of the medium, the wait time being a time from when the medium setting detection sensor detects the medium and to when the feed rollers start transporting the medium, waits for a changed wait time that has been changed, after the medium is manually inserted, and starts transporting of the medium after waiting for the changed wait time after changing the wait time, the method comprising:

acquiring the type of the medium;

changing the wait time depending on the type of the medium, by setting the wait time for the medium for which an error during transport has occurred consecutively twice or more in a predetermined time to a longer time than the wait time for the medium for which an error during transport has not occurred consecutively twice or more in the predetermined time;

waiting for the changed wait time after the medium is manually inserted;

starting the transporting the medium after waiting for the changed wait time after changing the wait time; and scanning the medium being transported to produce scan data.

* * * * *